(12) United States Patent
Najarro

(10) Patent No.: US 11,485,180 B2
(45) Date of Patent: Nov. 1, 2022

(54) RECOVERY ROPE ASSEMBLY AND BEARING SWIVEL HITCH

(71) Applicant: Monster Hooks Inc., San Jose, CA (US)

(72) Inventor: Marco A. Najarro, San Jose, CA (US)

(73) Assignee: Monster Hooks Inc., San Jose, CA (US)

( * ) Notice: Subject to any disclaimer, the term of this patent is extended or adjusted under 35 U.S.C. 154(b) by 82 days.

(21) Appl. No.: 16/666,297

(22) Filed: Oct. 28, 2019

(65) Prior Publication Data

US 2020/0130439 A1 Apr. 30, 2020

Related U.S. Application Data

(60) Provisional application No. 62/751,491, filed on Oct. 26, 2018.

(51) Int. Cl.
*B60D 1/18* (2006.01)
*D07B 1/02* (2006.01)

(52) U.S. Cl.
CPC ............. *B60D 1/187* (2013.01); *B60D 1/18* (2013.01); *D07B 1/02* (2013.01); *D07B 2205/2014* (2013.01)

(58) Field of Classification Search
CPC . D07B 1/18; D07B 1/185; B60D 1/18; B60D 1/182; B60D 1/187
See application file for complete search history.

(56) References Cited

U.S. PATENT DOCUMENTS

| | | | | |
|---|---|---|---|---|
| 464,283 A | * | 12/1891 | Hush | B68B 1/02 54/24 |
| 736,275 A | * | 8/1903 | Little | B68B 1/02 54/85 |
| 852,180 A | * | 4/1907 | Hoffman | A47C 21/022 24/72.5 |
| 1,344,959 A | * | 6/1920 | Pollard | A61B 17/1322 606/203 |
| 1,386,052 A | * | 8/1921 | Duggan | B60D 1/187 280/480 |
| 1,580,553 A | * | 4/1926 | Brenny | A01K 1/064 54/24 |
| 1,591,105 A | * | 7/1926 | Rolland | B60D 1/187 280/480 |
| 1,924,992 A | * | 8/1933 | Jasper | B60D 1/18 280/480 |
| 2,600,395 A | * | 6/1952 | Domoj | D07B 1/185 87/13 |

(Continued)

*Primary Examiner* — Shaun R Hurley
(74) *Attorney, Agent, or Firm* — Intellectual Property Law Group LLP

(57) ABSTRACT

There is a bearing swivel hitch comprising a housing and a mount. The inside of the housing is aligned with a plurality of bearings such that when the mount is inserted into the housing, the mount can rotate 360 degrees. There is a recovery rope assembly comprising at least two materials interwoven together with a first material substantially along a standing portion of the recovery rope assembly and a second material substantially along at least one working end of the recovery rope assembly. At the working end of the recovery rope assembly, there is a noose and a knob/knot which allows the working end to form a releasable end loop by mating the noose with the knob/knot.

20 Claims, 10 Drawing Sheets

(56) References Cited

U.S. PATENT DOCUMENTS

| | | | | |
|---|---|---|---|---|
| 3,718,947 A * | 3/1973 | Huber | ............... | B66C 1/14 24/298 |
| 4,225,172 A * | 9/1980 | Marquardt | ............ | F16G 11/03 294/74 |
| 4,519,564 A * | 5/1985 | Nadherny | ............ | F16L 3/14 24/115 H |
| 4,789,045 A * | 12/1988 | Pugh | ............ | A62B 1/20 114/362 |
| 4,860,408 A * | 8/1989 | Johnson | ............ | B60P 7/0823 24/68 CD |
| 5,062,344 A * | 11/1991 | Gerker | ............ | D04C 1/12 87/8 |
| 5,087,309 A * | 2/1992 | Melton, Jr. | ............ | A63B 69/38 156/198 |
| 5,662,295 A * | 9/1997 | Nadherny | ............ | F16L 3/14 248/58 |
| 6,142,547 A * | 11/2000 | Bowerman | ............ | A01K 1/0236 224/921 |
| 6,331,024 B1 * | 12/2001 | Gulley | ............ | B66C 1/18 294/74 |
| 7,845,150 B2 * | 12/2010 | Gibbons | ............ | B68B 1/02 54/24 |
| 7,959,650 B2 * | 6/2011 | Kaiser | ............ | A61F 2/0811 606/232 |
| 8,137,382 B2 * | 3/2012 | Denham | ............ | A61B 17/04 606/232 |
| 8,443,471 B2 * | 5/2013 | McCurdy | ............ | D07B 1/02 5/120 |
| 8,499,951 B1 * | 8/2013 | McDonald | ............ | B65D 23/106 215/396 |
| 8,590,116 B2 * | 11/2013 | Dahl | ............ | D07B 1/18 24/300 |
| 9,003,579 B1 * | 4/2015 | Pinholster, Jr. | ............ | A45F 3/24 5/120 |
| 9,243,428 B1 * | 1/2016 | Miracle | ............ | E05B 37/00 |
| 9,314,241 B2 * | 4/2016 | Stone | ............ | A61B 17/0401 |
| 9,381,013 B2 * | 7/2016 | Norton | ............ | A61B 17/0482 |
| 9,387,791 B2 * | 7/2016 | Mamie | ............ | D07B 5/005 |
| 10,253,438 B2 * | 4/2019 | De Graaf | ............ | A01K 74/00 |
| 2006/0075610 A1 * | 4/2006 | Buchanan | ............ | B65D 63/1018 24/300 |
| 2007/0137163 A1 * | 6/2007 | Hess | ............ | D07B 1/02 57/210 |
| 2008/0051834 A1 * | 2/2008 | Mazzocca | ............ | A61L 17/04 606/222 |
| 2010/0162882 A1 * | 7/2010 | Shakespeare | ............ | D04C 1/12 87/6 |
| 2013/0255045 A1 * | 10/2013 | Gonzalez | ............ | D07B 5/005 24/715.3 |
| 2015/0259852 A1 * | 9/2015 | Matsumoto | ............ | A01K 27/005 428/369 |
| 2015/0351739 A1 * | 12/2015 | Napolitano | ............ | A61B 17/0401 606/228 |
| 2017/0108081 A1 * | 4/2017 | Laurant | ............ | F16G 11/14 |
| 2017/0234025 A1 * | 8/2017 | Bottome | ............ | E04H 15/24 135/90 |
| 2018/0119341 A1 * | 5/2018 | Worswick | ............ | B66D 1/34 |
| 2018/0340346 A1 * | 11/2018 | Bottome | ............ | E04H 15/24 |

* cited by examiner

RECOVERY ROPE ASSEMBLY AND BEARING SWIVEL HITCH

CROSS-REFERENCE TO RELATED APPLICATION

This application claims the benefit of U.S. Provisional Application No. 62/751,491 filed Oct. 26, 2018, which is hereby incorporated by reference in its entirety.

FIELD OF THE INVENTION

This present invention generally relates to towing accessories, and more particularly to vehicle recovery.

BACKGROUND

Since the invention of the hitch, there are fixed hitches that do not rotate or move to accommodate different angles when recovering a vehicle unit. Since the hitch is static, it cannot recover a vehicle unit from any angle because "binding" occurs. For example, a fixed hitch cannot take on a side load because the hitch breaks as a result of the angle and load at which the recovery unit is pulled. This makes the fixed hitch impractical for recovering a vehicle unit because the recovering unit is typically stranded at angles relative to the towing vehicle. Secondly, current hitches are not designed to receive separate mounts. For example, the same hitch cannot switch between receiving a ball mount and a hook mount without having to change the entire hitch.

The current recovery ropes are made of a single material such as nylon, which does not provide enough strength to recover a vehicle unit without potentially breaking. Standard recovery ropes also have a permanently closed end loop on each end of the rope that is spliced into the body of the rope. Previous recovery ropes with two closed end loops at each working end of the rope must be used in conjunction with accessories, such as steel shackles, in order to connect the rope to the towing unit and the recovery unit. Using the recovery rope in conjunction with accessories is inefficient.

If a user decides to use only the recovery rope without any accessories, the user can, for example, loop a first closed end loop around a recovery vehicle and then pass a second closed end loop of the same rope through the first closed end loop to secure the recovery vehicle. The second closed end loop is then attached to the towing vehicle. However, the problem with this method of towing is that the towing vehicle must have a hook, shackle or some type of attachment point for the second closed end loop to attach to. Furthermore, once pressure is added to pull the rope tight, the rope becomes extremely tight around the recovery vehicle/object that it is nearly impossible to remove the rope without cutting the loop or destroying the fibers of the rope. If a shackle is used, an additional rope is needed to tie to the shackle. This can be cumbersome and burdensome because the user needs to ensure that the connection point between the shackle and the rope is secure in addition to the connection point between the shackle and the object.

Previous recovery ropes with only one closed end loop at a working end are useless if either the towing vehicle or recovery vehicle does not have a point of attachment because the end of the rope with the closed end loop cannot attach to the vehicle/object. These previous recovery ropes limit the rope's attachment point requiring other accessories to be used in conjunction with the recovery rope. Previous recovery ropes are too weak and break during use or the rope becomes too tight after towing that the rope must be cut in order to remove the knot around the object.

As such, there is a need for a rotating hitch that can rotate to change angles when recovering a unit and there is a need for a hitch to easily receive interchangeable mounts without replacing the entire hitch. As such, there is a need to have a recovery rope made of multiple materials/fibers to give the rope extra strength and durability when recovering a unit. There is also a need for a rope to easily connect and disconnect from objects/vehicles without having to destroy the rope. There is another need for the loop at each end of the rope to reversibly open and close in order to attach to different attachment points on the vehicle/object. There is a further need for a rope to attach to vehicles/objects without the use of accessories.

SUMMARY

The present application describes a bearing swivel hitch that attaches to a trailer hitch receiver, the bearing swivel hitch can rotate when towing a recovery vehicle.

In some embodiments, there is a swivel hitch for recovering an object, comprising a housing configured to receive a shaft of a mount, wherein the shaft, while inserted into the housing, is configured to substantially abut at least one inserted dowel. On the inside of the housing there is aligned a plurality of bearings for a head of the mount to swivel.

In some embodiments, the mount can have a different shaped head, such as a hook, or ball mount, or closed loop.

The present application describes a rope assembly for recovering an object, comprising a first noose located at a first working end and a second noose located at a second working end of the rope assembly. The first noose and the second noose is made of a second material. There is a first stopper located between the first working end and a standing portion and a second stopper located between the second working end and the standing portion. The first stopper and the second stopper is made of the second material and the second material and the first material are interwoven to create the rope assembly for harvesting kinetic energy to recover the object. The first noose can mate with the first stopper and the second noose can mate with the second stopper to form a releasable closed loop at the first working end and the second working end of the rope assembly and the standing portion is made of a first material.

The present application describes a rope assembly for recovering an object, comprising at least one noose made of a second material at a first working end of the rope assembly. There is a first material located between the first working end of the rope assembly and a second working end of the rope assembly, the first material interwoven with the second material. There is a first stopper made of the second material located substantially near the first working end of the rope assembly. There is at least one noose that releasably mates with the first stopper such that the first working end of the rope assembly is configured as a releasable closed loop.

These features, advantages and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

DETAILED DESCRIPTION OF EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

Figure 1:
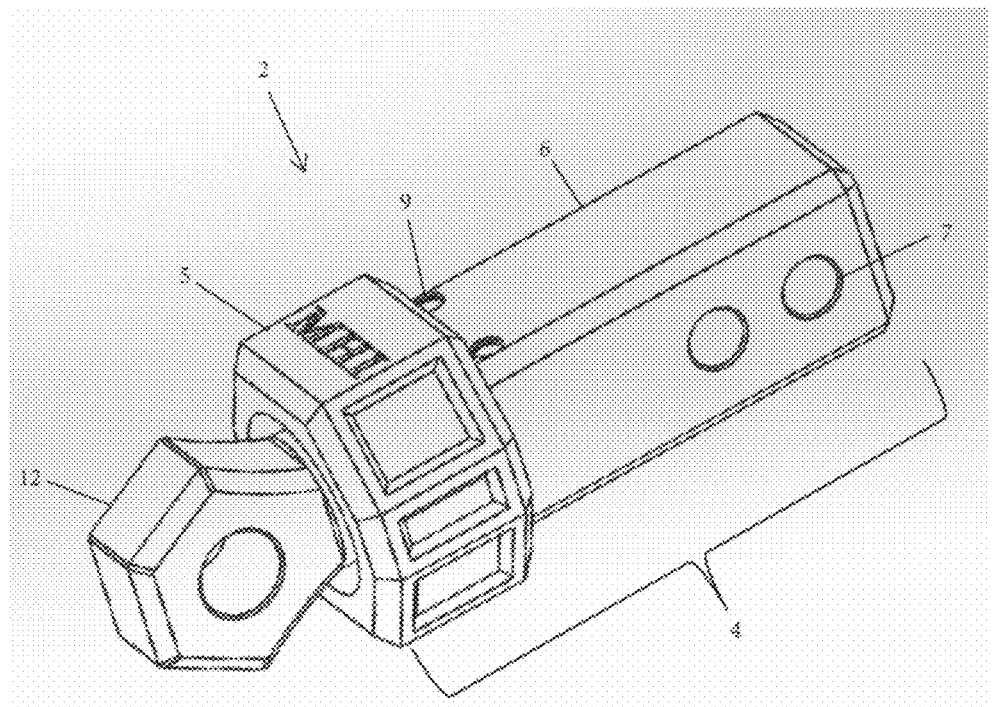
FIG. 1 illustrates the bearing swivel hitch, according to some embodiments of the present invention.

FIG. 1 illustrates the bearing swivel hitch 2 comprising the housing 4 and the mount 12, according to some embodiments of the present invention. As illustrated in FIG. 1 and FIGS. 3A-3G, the housing 4 comprises the receiver 6 and neck 5. The receiver 6 is inserted into a trailer hitch receiver of a towing vehicle and the housing 4 is locked in by inserting pins into the apertures 7. The openings 9 are located substantially near the neck 5 of the housing 4. In some embodiments, there are snap rings that are located in each opening 9 to prevent the dowels 18 from moving or falling out when the dowels 18 are inserted into the openings 9 during use. The snap ring is located in the snap ring groove 11 (see FIG. 3E). The openings 9 receive the dowels 18 (not shown, see FIG. 2) which lock the mount 12 with the housing 4. As illustrated in FIG. 3A, there is a cavity 8 in the housing 4 beginning from the neck 5 and extending into the receiver 6. The cavity 8 is where the mount 12 is inserted and when the mount 12 is fully inserted, the mount 12 extends substantially into the receiver 6. In some embodiments there is a snap ring that is located at the top of the cavity 8 to prevent the bearings 10 from moving or falling out when the bearing swivel hitch 2 is in use. The removable bearings 10 are located in the neck 5 of the housing 4. FIG. 3B illustrates a side view of the housing 4 of the bearing swivel hitch 2, according to some embodiments of the present invention. The neck 5 is where the removable bearings 10 are located. FIG. 3C illustrates a cross sectional view at A-A of FIG. 3B, according to some embodiments of the present invention. In some embodiments, such as the one illustrated in FIG. 3C, the shaft 16 sits in the neck 5 and the receiver 6. The shaft 16 does not extend throughout the receiver 6 but instead stops before the apertures 7. However, this is just one embodiment and the length of the shaft 16 and where it sits in the receiver 6 can be different in each embodiment.

As illustrated in FIG. 1-FIGS. 3A-3G, the housing 4 can be made of 7076-T6 steel and can be machined from one block of steel. However, the housing 4 can be made by other methods such as forging. The housing 4 can also be made from other types of materials such as steel, aluminum, and similar metals.

Figure 2:
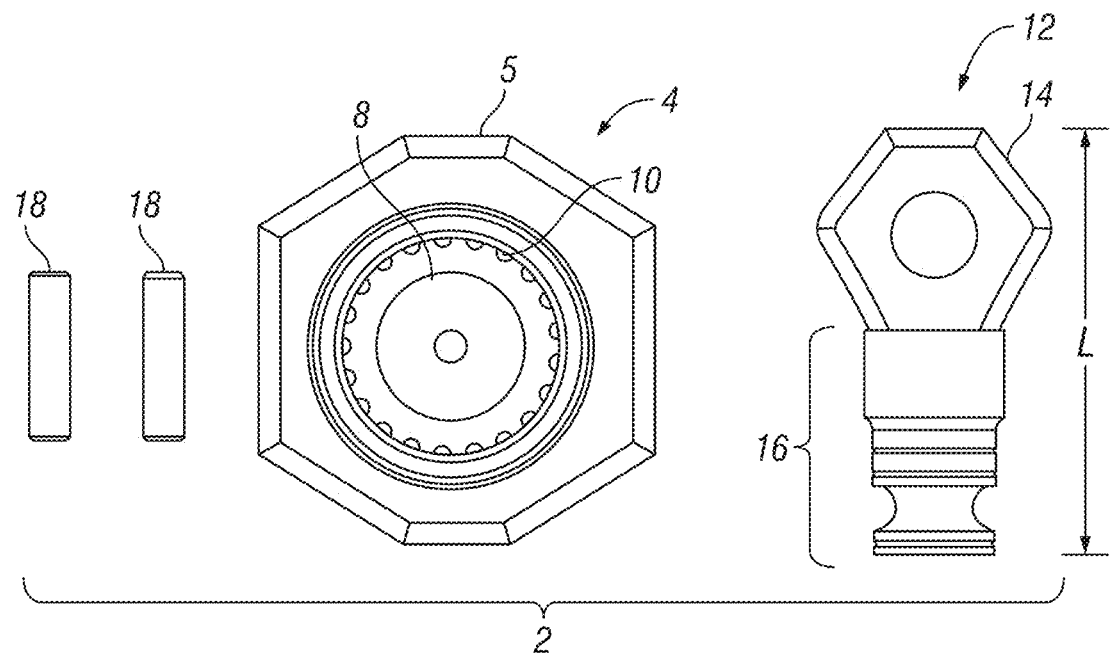
FIG. 2 illustrates the disassembled bearing swivel hitch with the mount removed from the housing, and separate dowels, according to some embodiments of the present invention.
Figure 3A:
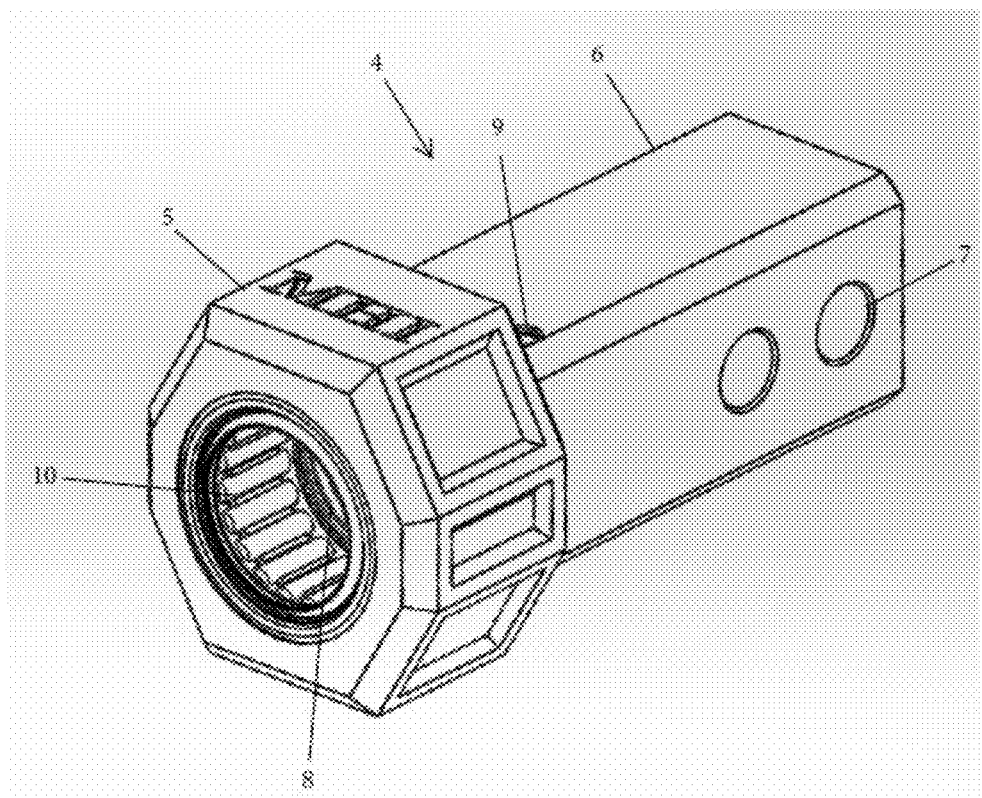
FIG. 3A illustrates the housing of the bearing swivel hitch, according to some embodiments of the present invention.
Figure 3B:
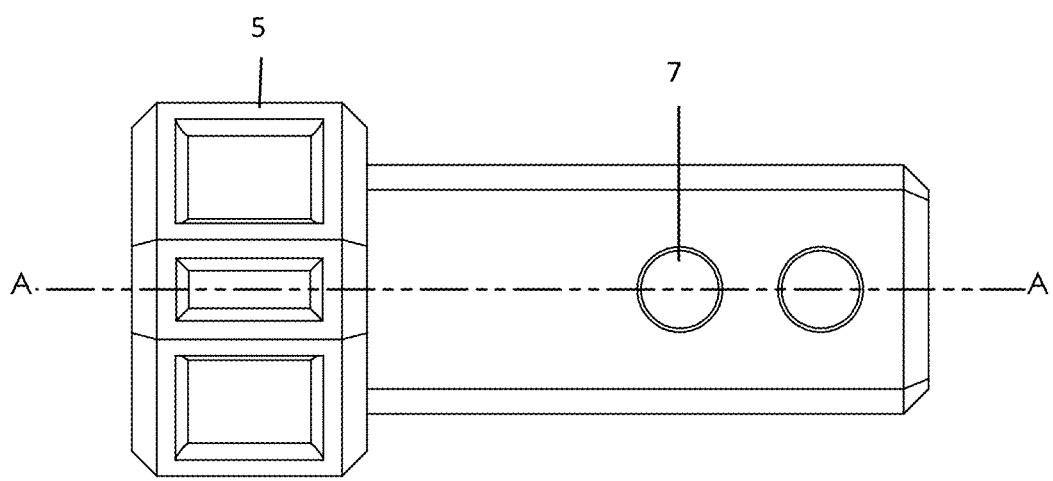
FIG. 3B illustrates a side view of the housing of the bearing swivel hitch, according to some embodiments of the present invention.
Figure 3C:
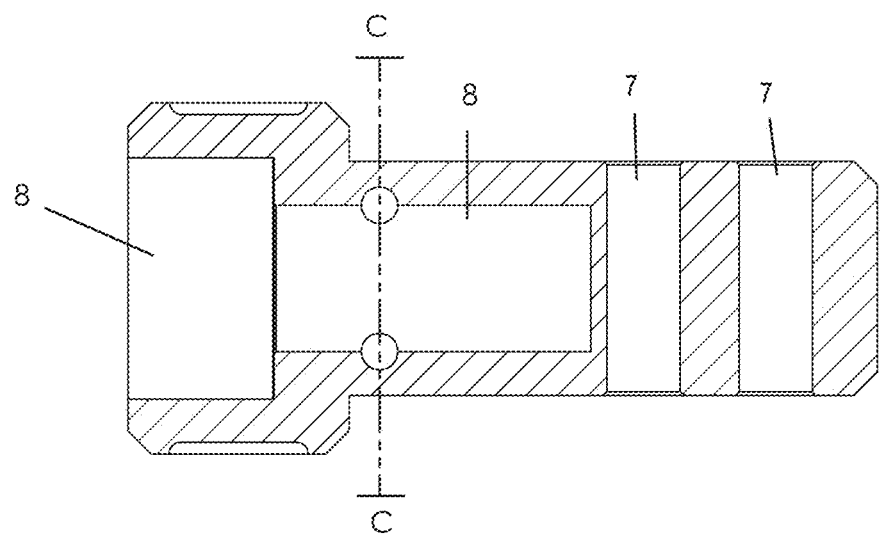
FIG. 3C illustrates a cross sectional view at A-A of FIG. 3B, according to some embodiments of the present invention.
Figure 3D:
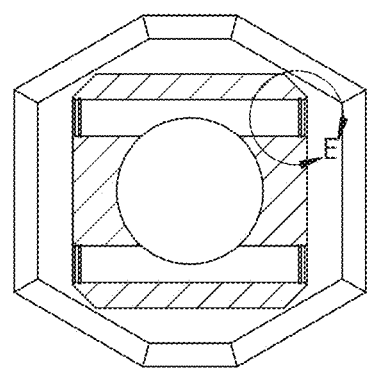
FIG. 3D illustrates a cross sectional view at C-C of FIG. 3C, according to some embodiments of the present invention.
Figure 3E:
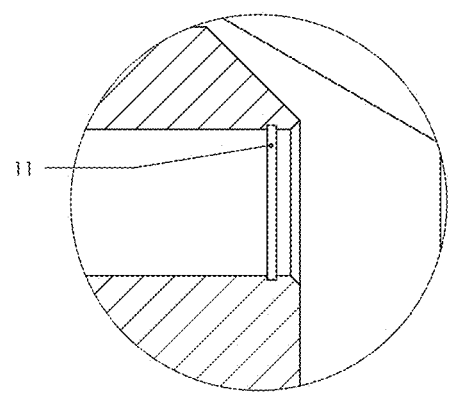
FIG. 3E illustrates an enlarged view of a portion of the bearing swivel hitch shown in FIG. 3D, according to some embodiments of the present invention.
Figure 3F:
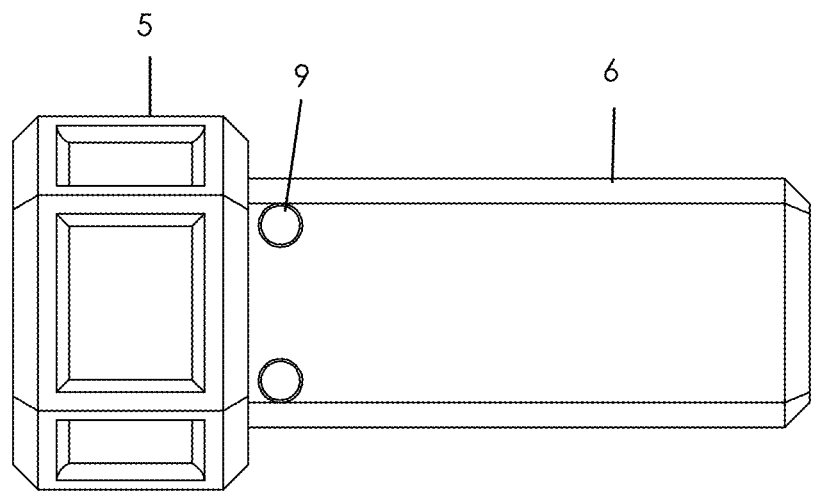
FIG. 3F illustrates another side view of the housing of the bearing swivel hitch, according to some embodiments of the present invention.
Figure 3G:
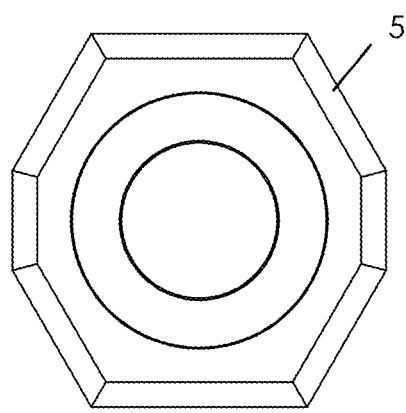
FIG. 3G illustrates a top view of the housing of the bearing swivel hitch, according to some embodiments of the present invention.

FIG. 2 illustrates the bearing swivel hitch 2 with the mount 12 removed from the housing 4, and dowels 18 separated from the housing 4, according to some embodiments of the present invention. Inside the cavity 8 there are bearings 10 that are built into the side wall of the neck 5. The bearings 10 are removable from the housing 4 and are interchangeable. In some embodiments, the bearings 10 are removed or replaced through a window located on the undersurface of the neck 5. The undersurface of the neck 5 refers to the surface facing towards the receiver 6. In some embodiments, the bearings 10 are water proof and dust proof. Different metals can be used to make the bearings 10. The bearings 10 allow the mount 12 to rotate smoothly and efficiently. The mount 12 can rotate 360 degrees and is heat treated for strength. In some embodiments, the mount 12 is made from 4140 steel. The cavity 8 allows different recovery mounts to be inserted into the same housing 4.

As illustrated in FIG. 2, the bearings 10 can be custom HD bearings, so the mount 12 can rotate under heavy loads. The bearings 10 can also be the standard bearings 10 found at hardware stores. The dowels 18 slide in and out of the receiver 6 through an opening 9 and secure the mount 12 to the housing 4. The diameter and length of the dowels 18 can be changed depending on the size needed. Removing the dowels 18 from the opening 9 allow the mount 12 to be pulled out from the housing 4. Other mounts 12 with a different head 14, such as a step, tow ball, hook, bike rack, or shackle can be used so long as the shaft 16 fits into the housing 4 (not shown, see FIG. 4E). In some embodiments, a locking mechanism, such as a pin, is inserted into the housing 4 to lock the mount 12 and keep it from rotating/ swiveling, i.e., keep the mount fixed. For example, when the head 14 is in the form of a step, the mount 12 should stay fix and not rotate.

Figure 4A:
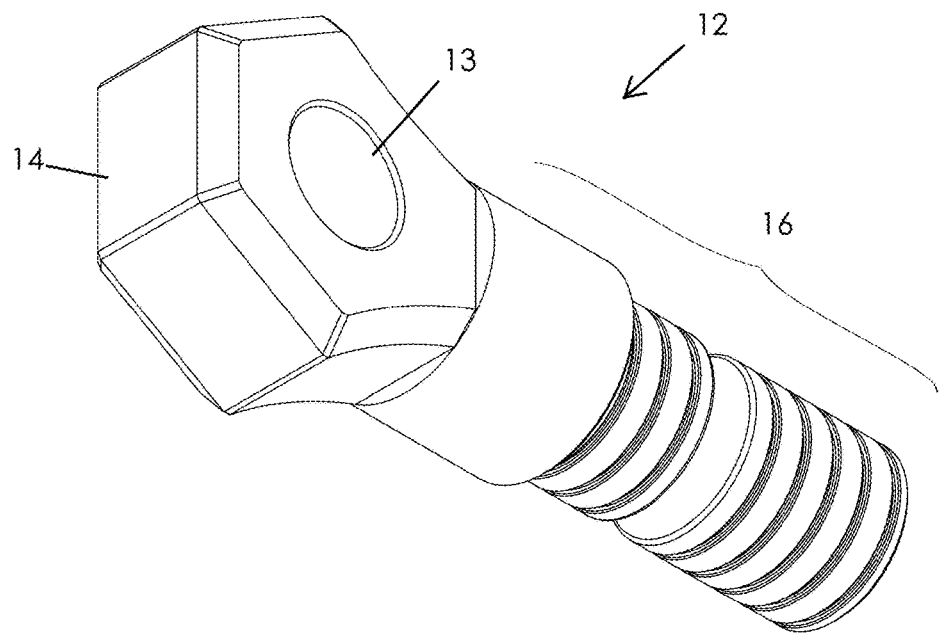
FIG. 4A illustrates a perspective view of a mount of the bearing swivel hitch, according to some embodiments of the present invention.
Figure 4B:
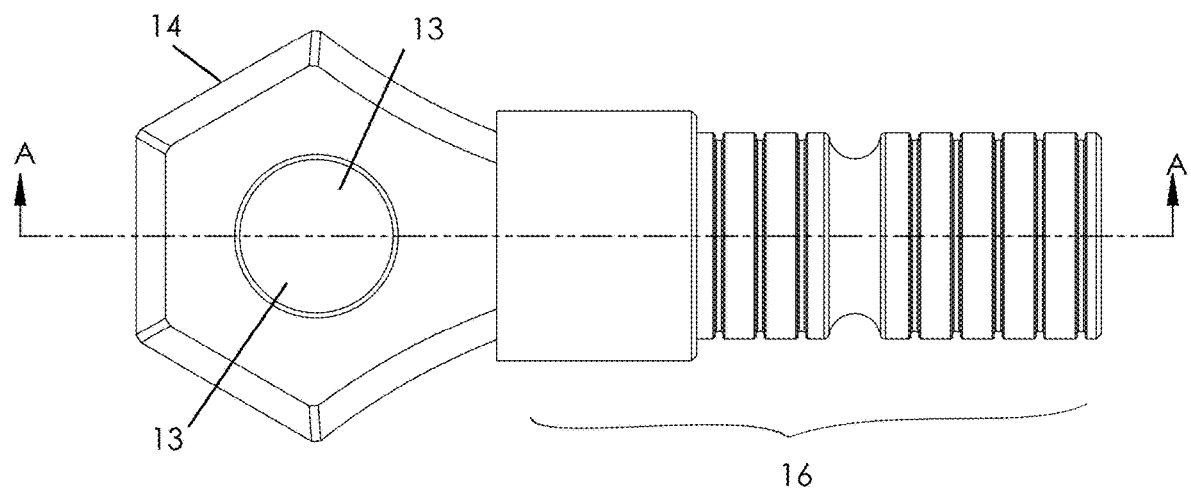
FIG. 4B illustrates a side view of the mount of the bearing swivel hitch, according to some embodiments of the present invention.
Figure 4C:
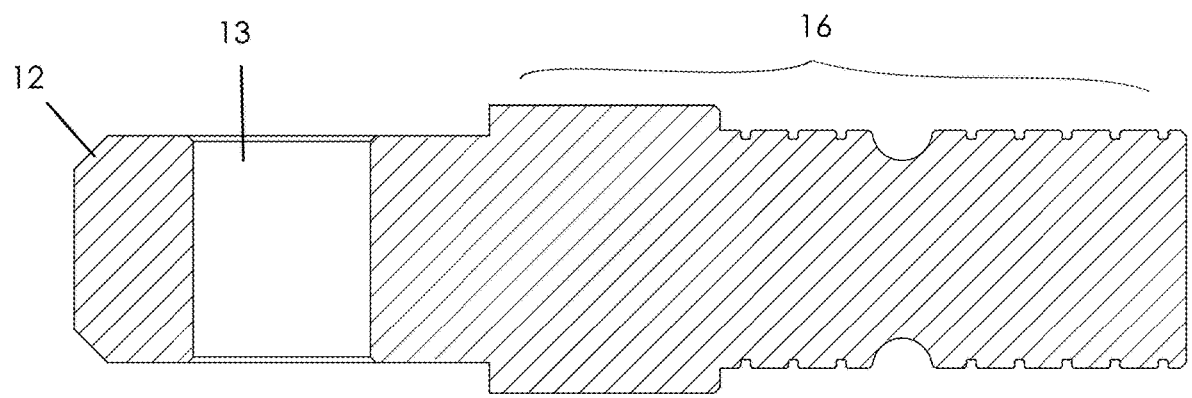
FIG. 4C illustrates a cross sectional view at A-A of FIG. 4B of the mount of the bearing swivel hitch, according to some embodiments of the present invention.
Figure 4D:
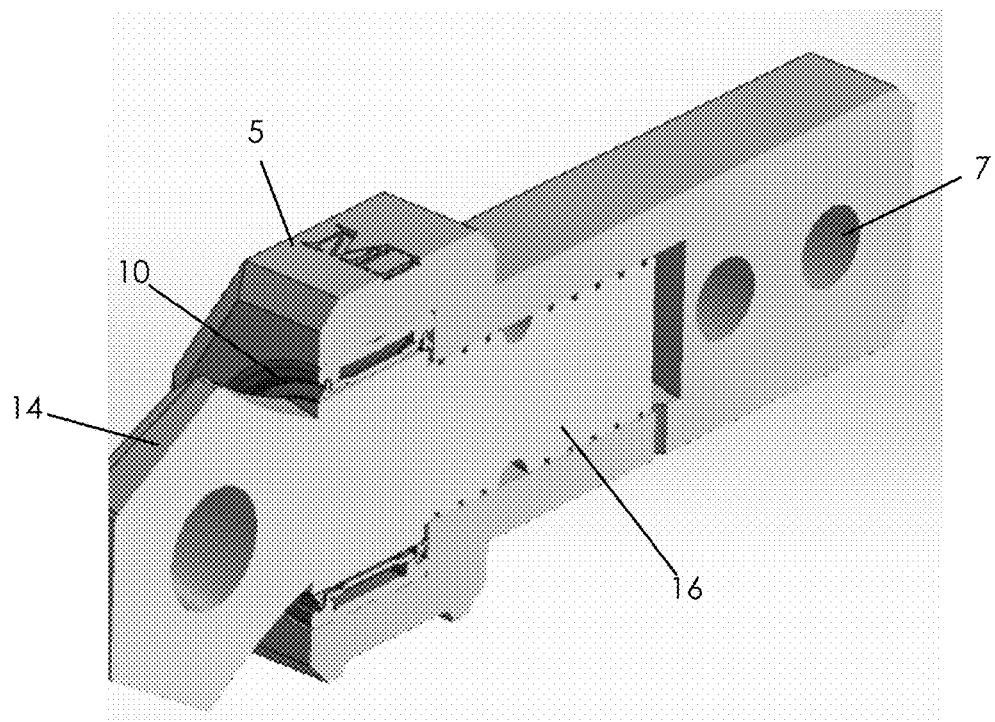
FIG. 4D illustrates a cross sectional view of the bearing swivel hitch, according to some embodiments of the present invention.
Figure 4E:
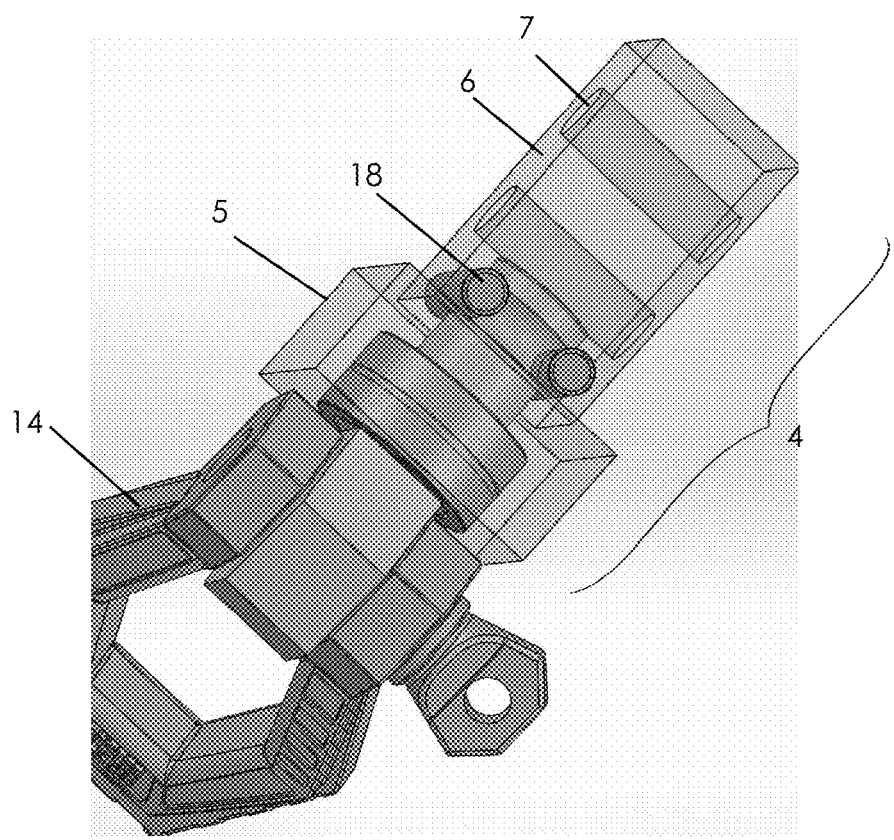
FIG. 4E illustrates an embodiment of the bearing swivel hitch with the mount having a different head, according to some embodiments of the present invention.

FIG. 2 and FIGS. 4A-4C illustrate the mount 12, according to some embodiments of the present invention. The mount 12 comprises the head 14 and shaft 16. In some embodiments such as the one shown in FIG. 4A-4B, the head 14 is hexagon shaped with a window 13 in the center. However, as mentioned above, other head 14 designs can be utilized. For example, the head 14 can be a step, tow ball, hook, bike rack, or shackle, square, round, etc. The shaft 16 can be shorter, longer, wider, narrower, square, round, etc. depending on the opening 9 of the receiver 6. The shaft 16 can be forged out of steel instead of machined. As illustrated in FIG. 2 and FIGS. 4A-4E, the length ("L") of the upper portion of the shaft, middle portion of the shaft, and lower portion of the shaft can be different depending on the weight capacity being pulled for the embodiment of the bearing swivel hitch 2. For example, if more pounds are being pulled, the length of the lower shaft is increased to prevent destruction of the mount 12 and to prevent the mount 12 from being pulled from the housing 4. The length of the middle portion of the shaft can be increased or decreased depending on the size of the dowels 18. When the mount 12 is inserted into the cavity 8 and the dowels are inserted into the openings 9, the dowels abut the indented portion of the middle portion of the shaft on both sides. The configuration of the dowels abutting the indented portion of the middle portion of the shaft locks the mount 12 in place while still allowing the head 14 to rotate. FIG. 4D illustrates a cross sectional view of the bearing swivel hitch, according to some embodiments of the present invention. When the mount 12 is inserted into the housing 4, a portion of the shaft 16 fits against the bearings 10, which allows the mount 12 to rotate 360 degrees. FIG. 4E illustrates an embodiment of the bearing swivel hitch with the mount having a different head 14, according to some embodiments of the present invention. As mentioned above, the head 14 of the mount 12 can change so long as the shaft 16 is able to fit into the cavity 8.

Figure 5:
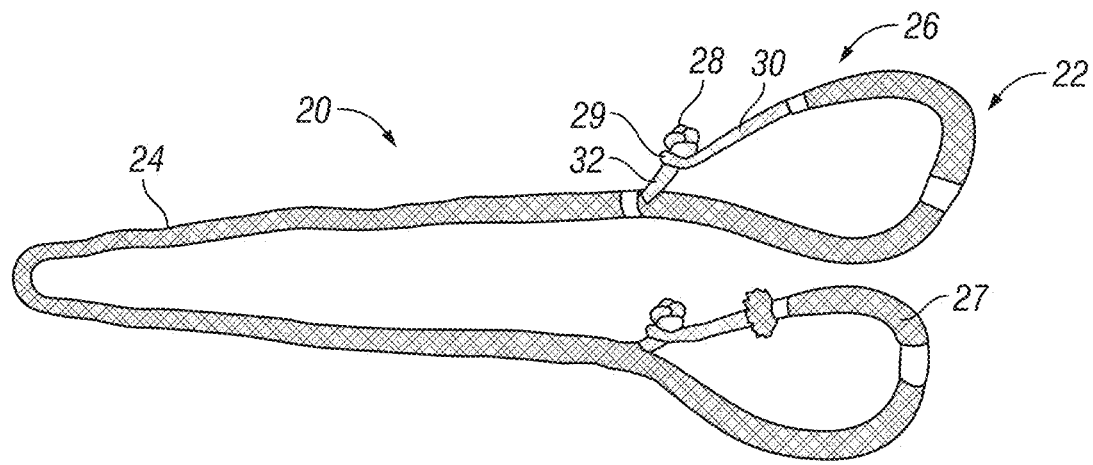
FIG. 5 illustrates a recovery rope assembly comprising two types of fibers, according to some embodiments of the present invention.
Figure 6:
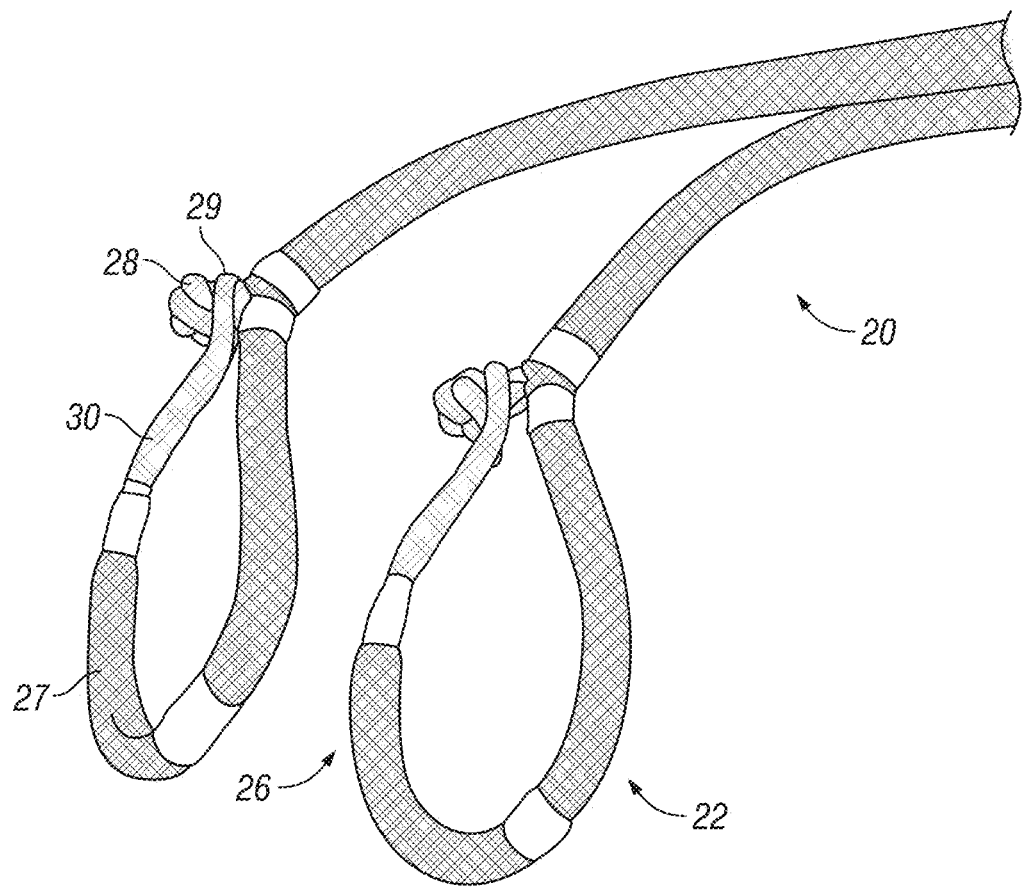
FIG. 6 illustrates an enlarged partial view of two closed end loops of the recovery rope assembly, each comprising a knob and a noose, according to some embodiments of the present invention.
Figure 7:
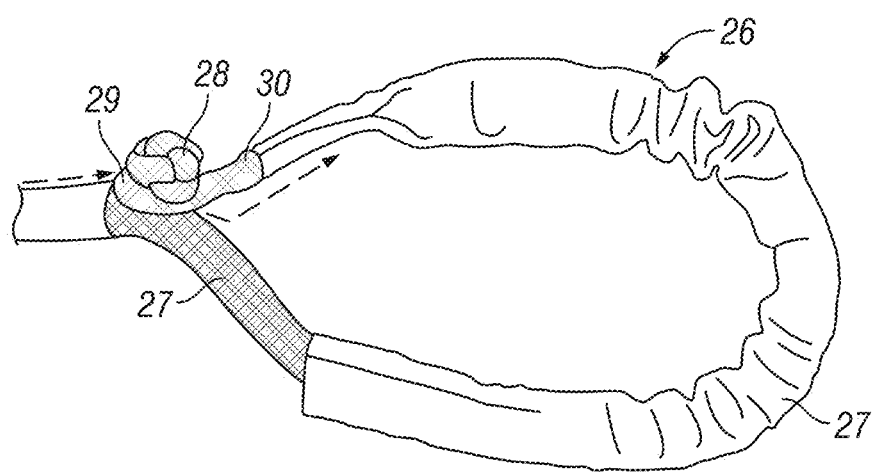
FIG. 7 illustrates a partial view of splicing of the second material into the first material portion of a closed end loop of the recovery rope assembly, according to some embodiments of the present invention.

FIG. 5-FIG. 7 illustrate a recovery rope assembly 20 having a closed end loop 22 on each working end 26, according to some embodiments of the present invention. The recovery rope assembly 20 comprises an end loop 22 or open ended position 21, a knob/knot 28, and a noose 29 at each working end 26 of the recovery rope assembly 20 and a standing portion 24. The working end 26 is a closed end loop 22 when the noose 29 is wrapped around the stem 32 of the knob/knot 28 forming a loop at either end of the recovery rope assembly 20. The working end 26 is at an open ended position 21 (not shown, see FIG. 8) when the noose 29 is not wrapped around the stem 32 of the knob/knot 28 and a complete loop is not formed. In some embodiments, there is one end loop 22 and in other embodiments, there are two end loops 22 on a recovery rope assembly 20. The end loop 22 is closed when the knob/knot 28 is passed through the noose 29. The noose 29 is secured around the stem 32 (not shown, see FIG. 8) and the knob/knot 28 acts like a stopper to prevent the noose 29 from sliding off the stem 32. In some embodiments a knot can also be a stopper. In other embodiments, the stopper can be in other forms so long as it functions to stop the noose 29 from slipping off the stem 32. The noose 29 tightens around the stem 32 under load and can be loosened without. The end loop 22 can be open to wrap around an axel or any part of a vehicle that does not have a point of attachment to create a pulling point.

Material, fiber, and strand are used interchangeably. The recovery rope assembly 20 is made of at least two types of materials, a first material 27 and a second material 30. In some embodiments the first material 27 is nylon and the second material 30 can be AmSteel®, Dyneema®, Plasma®, hemp, Spectra, poly(p-phenylene-2,6-benzobisoxazole), aramids (Kevlar, Technora, Twaron, Vectran, carbon fibers), ultra-high-molecular-weight polyethylene, or any other strong fiber.

Interwoven, interlacing, intermixing, blended can be used interchangeably. The end loop 22 is made substantially of the second material 30 interwoven into the first material 27. The knob/knot 28, stem 32, and noose 29 are made of the second material 30 and are located at the end loop 22. Since the end loop 22 on each working end 26 of the recovery rope assembly 20 comprises a knob/knot 28 and a noose 29, this eliminates the use of an accessory attachment, such as a steel shackle. The combination of the noose 29 and the knob/knot 28 provides the recovery rope assembly 20 with the ability to open or close the end loop 22. The end loop 22 allows the user to loosen or tighten the attachment around an object by simply loosening the noose 29 around the knob/knot 28. Under load, the noose 29 tightens around the stem 32 but can be loosened without the load. The closed end loop 22 assembly eliminates the need for an accessory attachment because in the open ended position 21 the recovery rope assembly 20 can wrap around/through an object and fold back on itself so that the noose 29 attaches to the stem 32 of the knob/knot 28 thus forming a closed end loop 22. This secures the recovery rope assembly 20 to the object without having to secure the end loop 22 to an accessory attachment. This also eliminates the need to cut the recovery rope assembly 20 around the attachment because the tightness of the noose 29 around the stem 32 can be loosened by lessening the load. By eliminating the accessory attachment, such as a steel shackle, the recovery rope assembly 20 is safer to use in public.

The end loop 22 on both working ends 26 of the rope 20 allows the user to secure the working ends 26 around any secure point on both the towing vehicle unit and the recovery vehicle unit and tighten the noose 29 around the knob/knot 28. When load is applied, the noose 29 and the knob/knot 28 create a secure connection because the noose 29 tightens around the stem 32. An alternative use of the recovery rope assembly 20 is to use accessory attachments, such as a hook, to connect to the end loop 22; however, this is not necessary.

FIG. 7 illustrates the splicing of the second material 30 spectra fiber, into the first material 27 of the recovery rope assembly 20, according to some embodiments of the present invention. The first material 27 is nylon fiber and the second material 30 is spectra fiber. The standing portion 24 of the recovery rope assembly 20 is made substantially of the first material 27; however, the second material 30 is interwoven into a portion of the standing portion 24. In some embodiments, the second material 30 is interwoven about two to three feet into the standing portion 24 of the recovery rope assembly 20. The process of splicing comprises the standing portion 24 (not shown, see FIG. 5), the working end 26 and the second material 30. The second material 30 is spliced into the working end 26 and the standing portion 24 using a class 1 eye splice (as shown by the arrow). Then a knob/knot 28 at the end of the working end 26 closest to the standing portion 24 is made. The knob/knot 28 prevents the noose 29 from sliding off the stem 32 as it acts like a stopper. The noose 29 tightens around the stem 32 to create a secure and tight connection so that the closed end loop 22 can recover/pull an object. As mentioned above, the first material 27 can be nylon and the second material 30 can be AmSteel®, Dyneema®, Plasma®, hemp, Spectra, poly(p-phenylene-2,6-benzobisoxazole), aramids (Kevlar, Technora, Twaron, Vectran, carbon fibers), ultra-high-molecular-weight polyethylene, or any other strong fiber.

In the embodiments disclosed there is a combination of a stronger second material spliced into a first material. The spectra fiber used as the second material 30, is very rigid and has no elasticity whereas the nylon material, used as the first material 27, has about 28% elasticity. The nylon portion of the recovery rope assembly 20 stretches which creates kinetic energy whereas the closed end loop 22 is very rigid with no stretch. With a combination of the spectra fiber and the nylon fiber, the recovery rope assembly 20 creates an extremely strong connection point, thus harvesting kinetic energy from the nylon to extract either a stuck vehicle unit or any other object. The combination also creates safe pull points at the ends of the recovery rope assembly 20. The recovery rope assembly 20 can be used not just for vehicle recovery but for pulling other objects.

Figure 8:
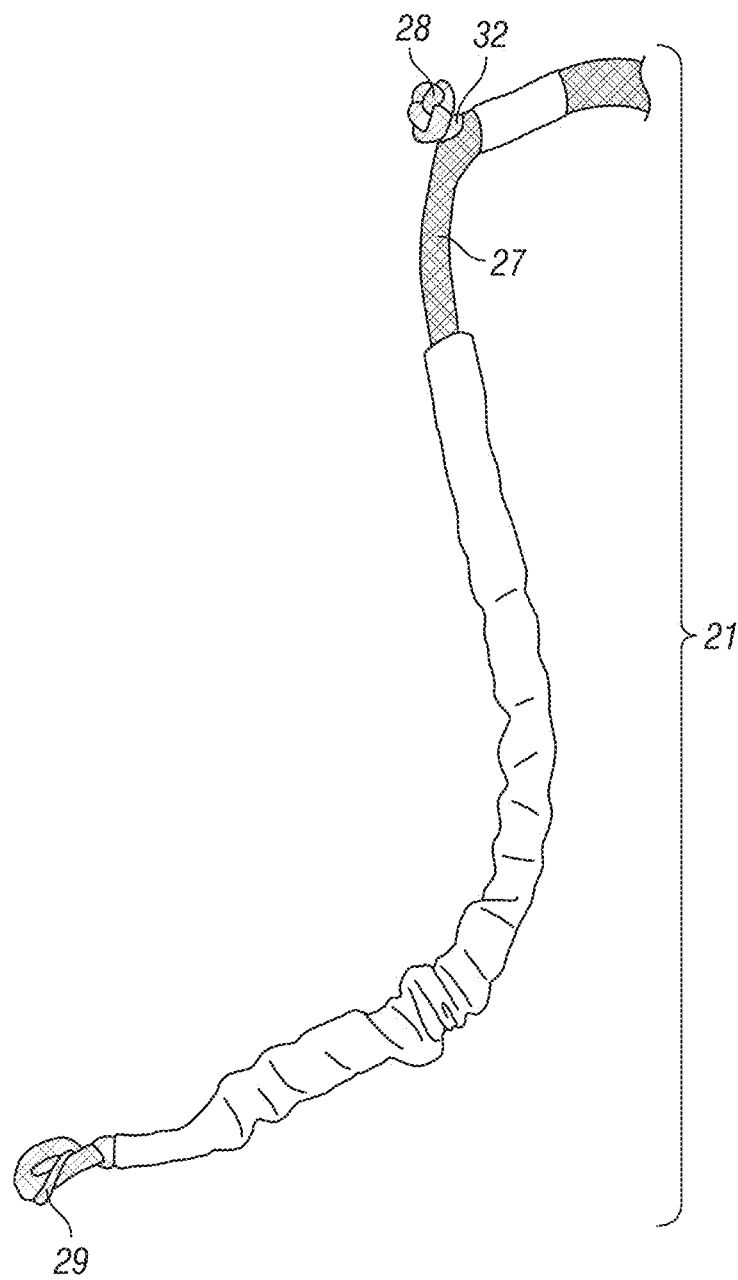
FIG. 8 illustrates a partial view of the recovery rope assembly in an open ended position, i.e. non-looped/open ended loop, according to some embodiments of the present invention.

FIG. 8 illustrates an open ended position 21 of the recovery rope assembly 20, according to some embodiments of the present invention. There is an open ended position 21 because the noose 29 is released from the stem 32 of the knob/knot 28. The length of the end loop 22 varies depending on where the knob/knot 28 is located relative to the noose 29. If a smaller diameter closed end loop 22 is desired, then the distance between the knob/knot 28 and the noose 29 will be shorter. If a larger diameter closed end loop 22 is desired, then the distance between the knob/knot 28 and the noose 29 will be longer. The location of the knob/knot 28 can be determined during the splicing of the second material 20 with the first material 27. The diameter of the noose 29, size of the knob/knot 28 and thickness of the stem 32 is changeable. In some embodiments where the recovery rope assembly 20 is needed for heavier loads, the size of the knob/knot 28, thickness of the stem 32 and diameter of the noose 29 increases. In some embodiments where the recovery rope assembly 20 is needed for lighter loads, the size of the knob/knot 28, thickness of the stem 32 and diameter of the noose 29 decreases.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments or alternatives of the foregoing description.

What is claimed is:

1. A rope assembly for recovering an object, comprising:
   a first material located between a first working end of the rope assembly and a second working end of the rope assembly, a majority of a length of the rope assembly comprising the first material;
   at least one noose made of a second material at the first working end of the rope assembly;
   a first stopper comprising a stem projecting from the first material which terminates into a protrusion having a diameter larger than a thickness of the stem,
   the first stopper made of the second material located substantially near the first working end of the rope assembly, the first material interwoven with the second material of both the at least one noose and the first stopper such that a portion of the first material continues between the first stopper and the at least one noose, creating a strong connection; and
   the at least one noose releasably mates with the first stopper, by engaging the stem of the first stopper such that the first working end of the rope assembly is configured as a releasable closed loop.

2. The rope assembly as in claim 1, further comprising a second noose at the second working end of the rope assembly for releasably mating with a second stopper.

3. The rope assembly as in claim 2, wherein the second noose is made of the second material.

4. The rope assembly as in claim 2, wherein the second stopper is made of the second material.

5. The rope assembly as in claim 1, wherein the first material is nylon.

6. The rope assembly as in claim 1, wherein the second material is an ultra-high molecular weight polyethylene sold under registered trademark Spectra®.

7. The rope assembly as in claim 1, wherein the second material is an ultra-high molecular weight polyethylene sold under registered trademark AmSteel®.

8. The rope assembly as in claim 1, wherein the second material is an ultra-high molecular weight polyethylene sold under registered trademark Dyneema®.

9. The rope assembly according to claim 1, wherein the first material interwoven with the second material provides the rope assembly a capacity to tow a vehicle.

10. The rope assembly according to claim 1, wherein the first material has a higher elasticity than the second material.

11. The rope assembly according to claim 1, where the first material is nylon and the second material is an ultra-high molecular weight polyethylene.

12. The rope assembly according to claim 1, wherein the second material is interwoven about two feet into the length of the first material.

13. A rope assembly for recovering an object, comprising:
   a first noose located at a first working end and a second noose located at a second working end of the rope assembly;
   a standing portion located between the first working end and the second working end, wherein the standing portion is made of a first material, and a majority of a length of the rope assembly comprises the first material;
   a first stopper located between the first working end and the standing portion and a second stopper located between the second working end and the standing portion, wherein the first noose, the second noose, the first stopper and the second stopper are made of a second material, the second material and the first material are interwoven to create the rope assembly for harvesting kinetic energy to recover the object,
   the second material of each noose and each stopper being interwoven with the first material such that a portion of the first material continues into each working end, continuing between the first stopper and the first noose, and continuing between the second stopper and the second noose;

each of the first stopper and the second stopper comprises a stem of the second material that projects from the standing portion and terminates into a protrusion having a diameter larger than a thickness of the stem, the first noose can mate with the first stopper and the second noose can mate with the second stopper by engaging its respective stem to form a releasable closed loop at each of the first working end and the second working end of the rope assembly respectively.

14. The rope assembly as in claim 13, wherein the first material is nylon.

15. The rope assembly as in claim 13, wherein the second material is an ultra-high molecular weight polyethylene sold under registered trademark Spectra®.

16. The rope assembly as in claim 13, wherein the second material is an ultra-high molecular weight polyethylene sold under registered trademark AmSteel®.

17. The rope assembly as in claim 13, wherein the second material is an ultra-high molecular weight polyethylene sold under registered trademark Dyneema®.

18. The rope assembly according to claim 13, wherein the first material has a higher elasticity than the second material.

19. The rope assembly according to claim 13, wherein the second material of each of the first stopper and the second stopper is spliced into the first material of the standing portion at each stem, wherein each protrusion is formed as a knot of the second material.

20. The rope assembly according to claim 13, wherein the second material is interwoven about two feet into the first material of the standing portion.

* * * * *